Sept. 6, 1949.     V. N. JOHNS     2,481,118
FISHING ROD HOLDER
Filed July 30, 1947
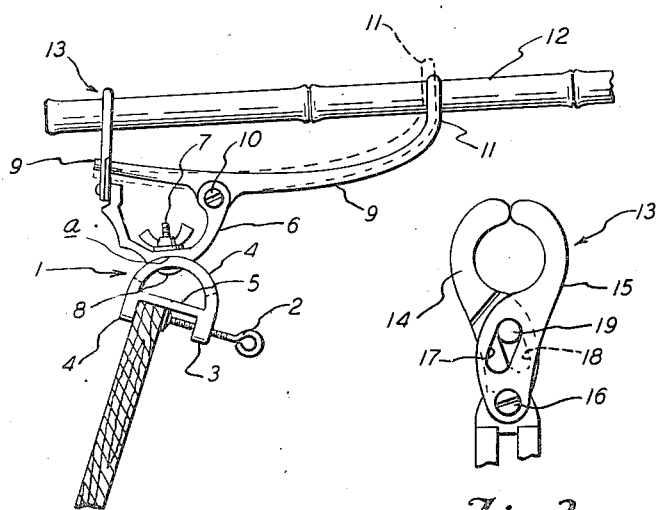
Fig. 3.
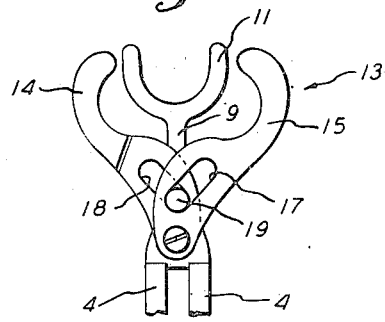
Fig. 4.
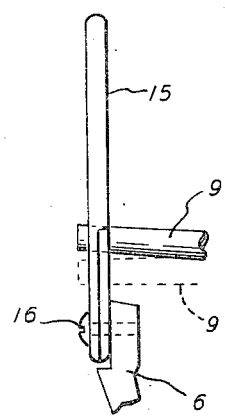
Fig. 1.
Fig. 2.
VERNON N. JOHNS
INVENTOR
BY Herbert J. Brown
ATTORNEY Patented Sept. 6, 1949

2,481,118

UNITED STATES PATENT OFFICE 2,481,118

FISHING ROD HOLDER

Vernon N. Johns, Fort Worth, Tex.

Application July 30, 1947, Serial No. 764,665

5 Claims. (Cl. 248—42)

This invention relates to fishing rod holders and has particular reference to a construction and arrangement for detachably supporting a fishing rod or fishing pole on the gunwale of a boat or other structure.

The primary object of the invention is to provide a holder of the described class which will allow the rod to be quickly detached, such as required when a fish is caught, yet one which has a locking action operated by the load applied to the rod and line.

A particular object of the invention is to provide a lever and jaw arrangement for carrying out the foregoing object.

Another object of the invention is to provide, in addition to the foregoing, an adjustment for positioning a rod or pole at any desired angle when the holder is attached to a supporting structure, such as the gunwale of a boat.

These and other objects will become apparent from the following description of an exemplary form of the invention illustrated in the accompanying drawings, and wherein:

Figure 1 is a side elevational view of a fishing rod holder embodying the features of the present invention, and is shown attached to a broken section of a supporting member, such as the gunwale of a boat, and also showing the handle end of a rod or pole engaged in place.

Figure 2 is an enlarged side elevational view of the clamping portion of the invention and particularly showing the action of the lever which is a part of the invention.

Figure 3 is an end elevational view of the clamp arrangement illustrated in Figure 2, and showing the same in its closed or holding position.

Figure 4 is a view similar to Figure 3, but showing the clamp in its open position.

The form of the invention illustrated includes a clamping member 1 which is substantially in the form of a C clamp and has a thumb screw 2 threadedly engaged in one of the opposing ends 3, whereas the other opposing end 4 serves as an abutment. A pair of arcuate tracks 4 integral with the clamp member 1 are provided opposite the connecting portion 5 of the C clamp arrangement, and are in spaced parallel relation with respect to each other.

A substantially U-shaped supporting member 6 having an arcuate recess at its lower end is retained on the arcuate tracks 4 by means of a wing nut and bolt arrangement 7, as shown in Figure 1, for retaining the said supporting member in place. The head 8 of the bolt assembly 7 engages the under sides of the tracks 4, and by reason of the described arcuate recess a in the U-shaped member 6, the supporting member 6 may be adjusted at various angles with respect to the horizontal.

One leg of the U-shaped member 6 is provided with a lever 9 and is pivotally secured to its supporting member 6 by means of a screw 10. One end of the lever 9 is arcuately and upwardly disposed where it terminates in a bifurcated fork 11 for supporting the under side of a pole or rod 12 near the latter's handle end. The other leg of the supporting U-shaped member 6 is provided with a clamp 13 comprised of pivoted hook shaped jaws 14 and 15, as particularly shown in Figures 3 and 4. The shanks of the hook shaped members 14 and 15 have a single pivot in the form of a screw 16 which is attached to the leg of the supporting member 6.

Oppositely and angularly disposed slots 17 and 18 are provided in the shanks of the hook members 14 and 15, respectively, and slidably receive a projecting end 19 of the lever 9, as particularly shown in Figures 3 and 4. It will be noted that when the clamp 13 is in its closed position the lower ends of the slots 17 and 18 are angularly and outwardly disposed with respect to each other, whereas the upper ends coincide to closely engage the referred to end 19 of the lever 9. When the clamp 13 is in its opened position, as shown in Figure 4, the upper ends of the slots 17 and 18 are apart and the lower ends coincide to engage the end 19 of the lever 9.

Thus, when a pole is placed in the fork 11 the jaws 14 and 15 may be opened by lifting the fork end upwardly, which action is carried out by the resulting tilting movement of the lever 9. After the handle end of the pole 12 is in place the weight of the pole tilts the forked end 11 of the lever 9 downwardly, thus causing the other end of the said lever to move upwardly. By reason of the described angularly disposed slots 17 and 18 in the jaws 14 and 15, the latter are moved together to hold the handle end of the said pole.

The form of the invention illustrated and described is not restricted, but may be varied in accordance with the scope of the appended claims.

What is claimed is:

1. A fishing rod holder comprised of a supporting assembly, a lever pivotally secured to the said supporting assembly, rod supporting means at one end of the said lever, a pair of pivoted jaws secured to the said supporting assembly, and slots in the shanks of the said jaws angularly disposed with respect to each other for slidably engaging the end of the said rod opposite the said rod supporting means.

2. A fishing rod holder comprised of a C clamp, arcuate track means integral with the said C clamp, a supporting member including an arcuate recess for coaction with the said track means, a lever pivotally secured to the said supporting member, rod supporting means at one end of the said lever, a pair of pivoted jaws secured to the said supporting member, and slots in the shanks of the said jaws angularly disposed with respect to each other for slidably engaging the end of the said rod opposite the said rod supporting means.

3. A fishing rod holder comprised of a C clamp, arcuate tracks integral with said C clamp and in uniform spaced relation with respect to each other, a U-shaped supporting member having an arcuate recess therein for coaction with said tracks, a wing nut and bolt assembly arranged for securing said U-shaped holder against said tracks, a lever pivotally supported on said supporting member, a fork at one end of said lever, and a clamp comprised of a pair of pivoted hooks supported by said supporting member and arranged for coaction with said lever.

4. A fishing rod holder comprised of a supporting assembly, a lever pivotally secured to said supporting assembly, a rod supporting fork at one end of said lever, a pair of pivoted jaws secured to said supporting assembly, and slots in the shanks of said jaws angularly disposed with respect to each other for slidably engaging the end of the said rod opposite the said fork.

5. A fishing rod holder comprised of a C clamp, arcuate tracks integral with said C clamp and in uniform spaced relation with respect to each other, a U-shaped supporting member for coaction with said arcuate tracks, a lever pivotally secured to one leg of said U-shaped supporting member, a rod supporting fork at one end of said lever, a pair of pivoted jaws secured to the leg of said U-shaped member opposite said leg supporting said lever, and slots in the shanks of said jaws angularly disposed with respect to each other and arranged for slidably engaging the end of said rod opposite the said fork.

VERNON N. JOHNS.

REFERENCES CITED

The following references are of record in the file of this patent:

FOREIGN PATENTS

| Number | Country | Date |
|---|---|---|
| 596,336 | France | Oct. 21, 1925 |